(12) United States Patent
Ha et al.

(10) Patent No.: US 11,489,476 B2
(45) Date of Patent: Nov. 1, 2022

(54) VEHICLE POWER CONVERSION APPARATUS AND METHOD

(71) Applicants: Hyundai Motor Company, Seoul (KR); Kia Motors Corporation, Seoul (KR)

(72) Inventors: Tae-Jong Ha, Seoul (KR); Byung-Gu Kang, Daegu (KR); Dae-Woo Lee, Incheon (KR); Youn-Sik Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 29 days.

(21) Appl. No.: 16/939,433

(22) Filed: Jul. 27, 2020

(65) Prior Publication Data
US 2021/0257951 A1 Aug. 19, 2021

(30) Foreign Application Priority Data
Feb. 17, 2020 (KR) .................. 10-2020-0018886

(51) Int. Cl.
*H02P 27/08* (2006.01)
*H02J 7/00* (2006.01)
*B60L 53/22* (2019.01)
*B60L 50/60* (2019.01)

(52) U.S. Cl.
CPC ............. *H02P 27/08* (2013.01); *B60L 50/66* (2019.02); *B60L 53/22* (2019.02); *H02J 7/0068* (2013.01); *B60L 2210/30* (2013.01)

(58) Field of Classification Search
CPC ...... B60L 53/22; B60L 50/66; B60L 2210/30; H02J 7/0068; H02P 27/08
See application file for complete search history.

(56) References Cited

U.S. PATENT DOCUMENTS

2016/0185237 A1* 6/2016 Ha .................... B60L 50/51
        318/139
2018/0162371 A1* 6/2018 Colavincenzo ........... B60L 7/10

FOREIGN PATENT DOCUMENTS

| JP | 2000188120 A | * | 7/2000 | .............. H01M 8/04 |
| KR | 10-2018-0074300 A | | 7/2018 | |
| KR | 10-2019-0072802 A | | 6/2019 | |

* cited by examiner

*Primary Examiner* — Jared Fureman
*Assistant Examiner* — Duc M Pham
(74) *Attorney, Agent, or Firm* — Fox Rothschild LLP (57) ABSTRACT

A vehicle power conversion apparatus is provided to reduce an overall system size by integrating a motor controller which generates power and a power supply apparatus which converts the power. The vehicle power conversion apparatus includes a driving motor which is connected to an engine and a power converter which selectively converts power in a plurality of modes to generate the power related to an operation of the driving motor. A first battery supplies the power for the conversion or receives the converted power.

14 Claims, 6 Drawing Sheets

VEHICLE POWER CONVERSION APPARATUS AND METHOD

CROSS-REFERENCE TO RELATED APPLICATION

This application claims priority to Korean Patent Application No. 10-2020-0018886, filed on Feb. 17, 2020, which is incorporated herein by reference in its entirety.

BACKGROUND

Field of the Disclosure

The present disclosure relates to a power conversion technology, and more particularly, to a vehicle power conversion apparatus and method.

Description of Related Art

Generally, in a hybrid system applied to a hybrid vehicle, the lack of power eventually requires an increase in the capacity of an alternator and a battery. Accordingly, it is necessary to increase wiring/harness and/or increase the weight of the vehicle. Particularly, in a mild hybrid system, a driving motor and an engine are connected by a belt, and an inverter for operating the driving motor is integrated with the driving motor to form a mild hybrid starter generator (MHSG).

Further, the power generated by the MHSG is used to charge a 48V battery or is supplied to a vehicle electrical load through a direct current-direct current (DC-DC) converter, which is a power supply apparatus, or is used to charge a 12V auxiliary battery. The inverter includes three phases, each of which operates as a parallel switch. Further, the converter which converts the power of the 48V battery into the 12V, which is a step-down converter, is configured as a parallel module.

Since the mild hybrid system uses a substantial amount of current, there is a disadvantage in that a parallel configuration is required. Further, there is a limitation in that it is difficult to configure a layout compared to a basic vehicle according to the size and/or configuration of an additional 48V dedicated component. In addition, there is a disadvantage in that the final output efficiency is degraded according to the power conversion of various stages.

The contents described in this section are merely to help the understanding of the background of the present disclosure, and may include what is not previously known to those skilled in the art to which the present disclosure pertains.

SUMMARY

The present disclosure provides a vehicle power conversion apparatus and method, which may reduce the overall size by integrating a motor controller which generates power and a power supply apparatus which converts power. Further, the present disclosure also provides a vehicle power conversion apparatus and method, which may improve output efficiency through a control of an integrated component.

For achieving the objects, the present disclosure provides a vehicle power conversion apparatus which may reduce the size by integrating a motor controller which generates power and a power supply apparatus which converts the power. The vehicle power conversion apparatus may include a driving motor connected to an engine, a power converter configured to selectively convert power in a plurality of modes to generated the power related to an operation of the driving motor, and a first battery configured to supply the power for the conversion or receive the converted power.

The power converter may include an inverter and a converter formed integrally. The inverter may be configured to supply alternating current (AC) power to the driving motor and the converter may be configured to convert the AC power into direct current (DC) power. Further, the power converter may include a switching network configured to perform a power control between the converter and the inverter. The switching network may include: a first switching block which cuts off the power transfer to the output side of the converter; and a second switching block which separates the output of the converter from one phase output of the inverter upon an operation of the converter, and the first switching block and the second switching block may be connected in series.

Further, the plurality of modes include a large power operation mode which requires large power and a general operation mode which does not require the large power. The converter may be operated after being separated from one phase output of the inverter. The large power generation has a power path in the order of the driving motor, the inverter, and the first battery, and the torque assist has a power path in the order of the first battery, the inverter, and the motor.

Additionally, in the large power operation mode, when the power transfer to the output side of the converter is cut off, power is supplied to the electrical load from the second battery. The inverter may include a plurality of power elements symmetrically for each phase, the plurality of power elements may be connected in parallel, and the first switching block may be disposed between the plurality of power elements in one of the phases and may be shared with the converter.

The converter may include the remaining power elements among the plurality of power elements shared with the inverter, the second switching block connected to the remaining power elements, and an inductor connected to the second switching block in series. Each of the first switching block and the second switching block has a back-to-back structure in which a plurality of switching elements are connected to each other in a back-to-back manner.

Another exemplary embodiment of the present disclosure provides a vehicle power conversion method that may include selecting a plurality of modes; and converting, by a power converter, power to generate power related to an operation of a driving motor as the plurality of modes are selected, and the power converter may be configured to receive the power from a first battery, or the power converter may be configured to supply the power to the first battery.

According to the present disclosure, it may be possible to reduce the size and/or increase efficiency by integrating the mild hybrid power conversion components. Further, another effect of the present disclosure is that by using the inverter parallel switch as the main switch of the converter, it may be possible to remove all of the existing converter parallel switches and to also reduce the number of parallel magnetic bodies, thereby reducing the size. Further, still another effect of the present disclosure is that by distinguishing and operating the modes such as large-power operation and 12V power supply operation according to the requirements of the vehicle electrical components, thereby increasing power conversion efficiency.

BRIEF DESCRIPTION OF THE DRAWINGS

The objects, features and advantages of the present disclosure will be more apparent from the following detailed description in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure may have various modifications and various exemplary embodiments, and specific embodiments are illustrated in the drawings and specifically described in the detailed description. However, it should be understood that this is not intended to limit the present disclosure to the specific embodiments, and the present disclosure includes all modifications, equivalents, and substitutes included in the spirit and technical scope of the present disclosure.

In describing each drawing, similar reference numerals are used for similar components. Terms such as first and second may be used to describe various components, but the components should not be limited by the terms. The terms are used only for the purpose of distinguishing one component from other components. For example, the first component may be referred to as a second component without departing from the scope of the present disclosure, and similarly, the second component may also be referred to as the first component. The term "and/or" includes a combination of a plurality of related described items or any one of the plurality of related described items.

Unless defined otherwise, all terms used herein, including technical or scientific terms, have the same meaning as commonly understood by those skilled in the art to which the present disclosure pertains. Terms such as those defined in a commonly used dictionary should be construed as having meanings consistent with meanings in the context of related technologies, and should not be construed as ideal or excessively formal meanings unless explicitly defined in the present application.

Hereinafter, a vehicle power conversion apparatus and method according to an exemplary embodiment of the present disclosure will be described in detail with reference to the accompanying drawings.

Figure 1:
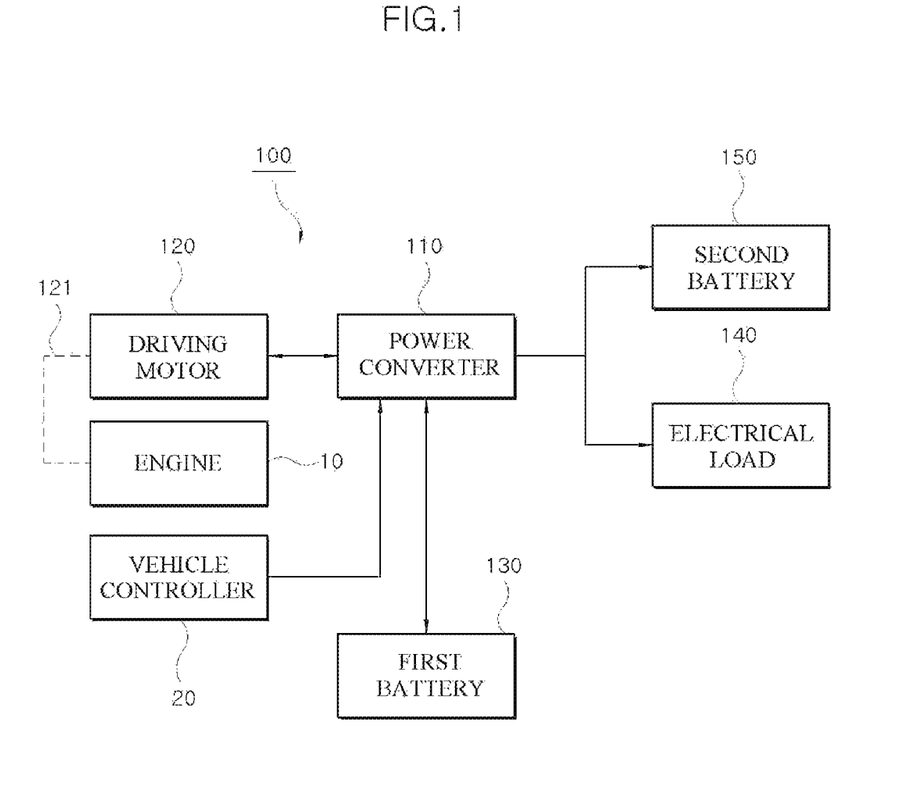
FIG. 1 is a block diagram illustrating a configuration of a vehicle power conversion apparatus according to an exemplary embodiment of the present disclosure.

FIG. 1 is a block diagram illustrating a configuration of a vehicle power conversion apparatus 100 according to an exemplary embodiment of the present disclosure. Referring to FIG. 1, the vehicle power conversion apparatus 100 may include an engine 10, a power converter 110, a driving motor 120, a first battery 130, an electrical load 140, and a second battery 150.

The engine 10 may be continuous variable valve timing (CVVT), double overhead camshaft (DOHC), gasoline direct injection (GM), and multi point injection (MPI) engines which use gasoline as fuel, common rail direct injection (CRDI), high direction turbo intercooler (HTI), and variable geometry turbocharger (VGT) engines which use diesel as fuel, a liquid propane injection (LPi) engine which uses gas as fuel, and the like. The power converter 110 may be configured to operate the driving motor 120 by converting the generated power of the three-phase AC generated by the driving motor 120 into DC, or conversely, convert DC into three-phase AC. In other words, the power converter 110 may be configured to convert the generated power of the three-phase AC generated by the driving motor 120 into DC power to supply the DC power into the first battery 120, the electrical load 140, and the second battery 150.

Further, the power converter 110 may be configured to convert the DC power stored in the first battery 130 into the three-phase AC to supply the three-phase AC to the driving motor 120. The power converter 110 may be configured to boost the DC power stored in the first battery 130 to supply the boosted DC power to the driving motor 120, or step-down the DC power to supply the stepped-down DC power to the second battery 150 and/or the electrical load 140.

The driving motor 120 may be operated to start the engine 10. Further, the driving motor 120 may be configured to generate power generated by the rotation of the engine 10. The driving motor 120 may include a permanent magnet type and an electromagnet. In other words, a stator (not illustrated) includes a permanent magnet type, and a rotor (not illustrated) includes an electromagnet. Accordingly, first, an excitation current for pre-fluxing the electromagnet of the rotor is allowed to flow to operate the driving motor 120.

The engine 10 and the driving motor 120 may be connected to a crankshaft shaft of the engine 10 through a connection component. Accordingly, the driving motor 120 may be inversely driven through the rotation of the engine 10 upon regenerative braking, thereby generating power. The connection component 121 may be a belt, a spur gear, a sprocket, or the like. The first battery 130 may operate as a main battery to receive the DC power from the power converter 110 and be charged with the received DC power, or to supply the DC power stored in the power converter 110. The first battery 130 may have an output voltage of about 48V, but is not limited thereto.

The first battery 130 may be a super capacitor or a lithium ion battery. In addition to the above, the first battery 130 may also be a high voltage battery for an electric vehicle, such as a nickel metal battery, a lithium polymer battery, an all-solid battery. Further, the first battery 130 may also be one battery cell, or may also be a battery pack in which these battery cells are provided in series and/or in parallel. The battery cell may be designed as a cylindrical cell, a prismatic cell, or a pouch-shaped cell. The pouch-shaped cells include a flexible cover composed of a thin film, and electrical components of the battery cell are disposed within the cover.

The pouch-shaped cells are particularly used to implement optimal space utilization within one battery cell. The pouch-shaped cells are also characterized by low weight as well as high capacity. The edges of the aforementioned pouch-shaped cells include a sealing joint (not illustrated). In other words, the sealing joint connects two thin films of each of the battery cells, and the thin films include additional components in a cavity formed thereby.

The second battery 150 may be generally a lead acid battery as an auxiliary battery, but is not limited thereto, and may be a nickel metal battery, a lithium polymer battery, a lithium ion battery, a super capacitor, or the like. Accordingly, the second battery 150 may be charged by receiving the DC power from the first battery 130. The output voltage of the second battery 150 may be about 12V, but is not limited thereto.

A vehicle controller 20 may be configured to execute a large power operation mode or a normal operation mode in response to a driver's command. Further, the vehicle controller 20 may be configured to confirm the charge amount using the auxiliary battery state information of the second battery 150 and the battery state information of the first battery 130. The battery state information may be State Of Charge (SOC), State Of Health (SOH), Depth Of Discharging (DOD), State Of Function (SOF), and the like. The engine 10 illustrated in FIG. 1 includes an engine controller (not illustrated), and the driving motor 120 may separated by a power converter without including a motor controller. The electrical load 140 may be an electrical component such as a lamp.

Figure 2:
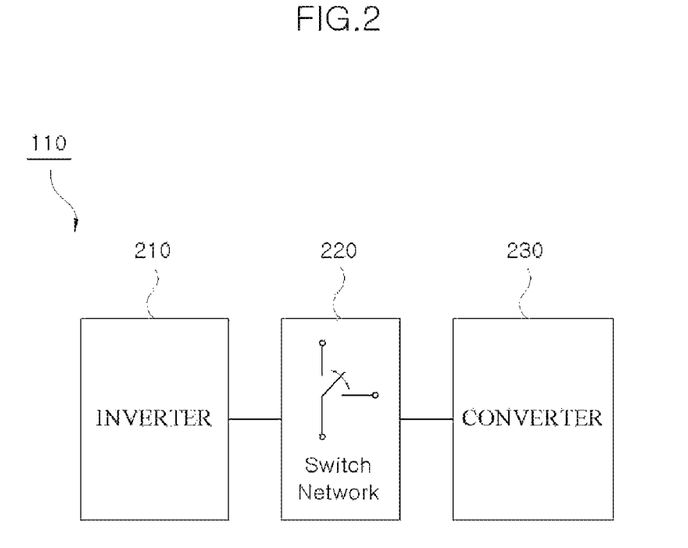
FIG. 2 is a block diagram illustrating a configuration of a power converter illustrated in FIG. 1 according to an exemplary embodiment of the present disclosure.

FIG. 2 is a block diagram illustrating a configuration of the power converter 110 illustrated in FIG. 1. Referring to FIG. 2, the power converter 110 may include an inverter 210, a switch network 220, and a converter 230. The inverter 210 may be configured to convert direct current (DC) power into three-phase alternating current (AC) power to supply the three-phase AC power to the driving motor 120 or receive and convert the three-phase AC power into the DC power. The inverter 210 uses a pulse width modulation (PWM) inverter which is a voltage-type inverter, but is not limited thereto, and may also use a current-type inverter by modifying some components. The PWM inverter may be configured to simultaneously adjust a voltage and a frequency using the pulse width modulation (PWM) control method for the rectified DC voltage.

The converter 230 may be configured to perform a step-down or step-up function. In other words, the converter 230 may be configured to perform a stepping-down of the DC power supplied by the inverter 210 to supply the stepped-down DC power to the first battery 130 and/or the electrical load 140. For example, the converter 230 may be configured to convert 48V supplied from the inverter 210 to 12V to supply the 12V to the first battery 130, the second battery 150, the electrical load 140, and the like. Further, the converter 230 may be configured to perform a stepping-up of the DC power supplied from the first battery 130 to supply the stepped-up DC power to the inverter 210. For example, the converter 230 may be configured to convert 12V supplied from the first battery 130 to 48V to supply the 48V to the inverter 210.

Accordingly, the converter 230 may be a direct current-direct current (DC-DC) converter, and may be a bidirectional low direct current direct current converter (LDC). Of course, the converter 230 may include a boost and/or buck circuit. The switch network 220 is involved in a power control between the inverter 210 and the converter 230.

Figure 3:
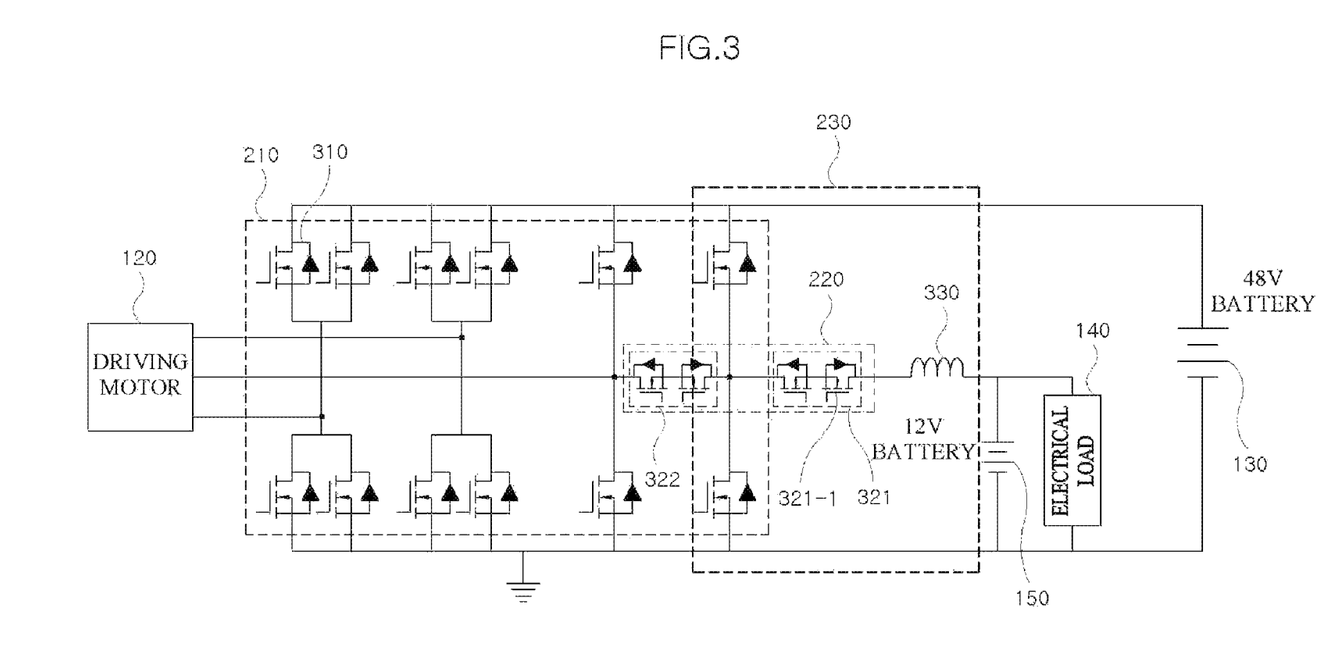
FIG. 3 is a block diagram illustrating a detailed configuration of the components illustrated in FIG. 2 according to an exemplary embodiment of the present disclosure.

FIG. 3 is a block diagram illustrating a detailed configuration of the components 210, 220, 230 illustrated in FIG. 2. Referring to FIG. 3, the inverter 210 may have a three-phase structure and two power elements 310 connected in parallel. Accordingly, upon large power generation or general driving, the inverter 310 may be operated by distributing a current to each power element 310. The large power may be about 17~20 kVA/liter.

The power element 310 may use a semiconductor switching element such as a field effect transistor (FET), a metal oxide semiconductor FET (MOSFET), an insulated gate bipolar mode transistor (IGBT), or a power rectifying diode, a thyristor, a gate turn-off (GTO) thyristor, a triode for alternating current (TRIAC), a silicon controlled rectifier (SCR), an integrated circuit (IC) circuit, or the like. Particularly, the semiconductor element may use a bipolar, a power metal oxide silicon field effect transistor (MOSFET) element, or the like. The power MOSFET element has a double-diffused metal oxide semiconductor (DMOS) structure unlike a typical MOSFET due to a high voltage and high current operation.

Further, the switching network 220 may include a first switching block 321 and a second switching block 322. A switching element 321-1 also has the same power switch of the inverter. However, for understanding, in an exemplary embodiment of the present disclosure, the switching element and the switch will be named differently. In other words, the switching element used in the inverter has a higher power per unit than the switch used in the converter, thereby handling all of the outputs of the converter.

The first switching block 321 and the second switching block 322 have back-to-back structures in which two switching elements 321-1 are connected in a back-to-back manner. Since the directionality disappears, the switching blocks operate similar to a normal switch. Accordingly, when the converter 230 operates, the switching blocks serve to separate the outputs of the converter 230 and the inverter 210. Further, the first switching block 321 and the second switching block 322 may prevent a reverse current.

Accordingly, the switching blocks may be turned on when 5V is input to a gate, and the switching blocks may be turned off when the 5V is not input. Particularly, the first switching block 321 may be configured to cut off power transfer to the output side of the converter 230. The second switching block 322 may be configured to separate the output of the converter 230 from the phase output of the inverter 210 upon an operation of the converter 230. An inductor 330 may be disposed between the first switching block 321 and the second battery 150 and the electrical load 140. Further, the second battery 150 and the electrical load 140 may be disposed in parallel.

Figure 4:
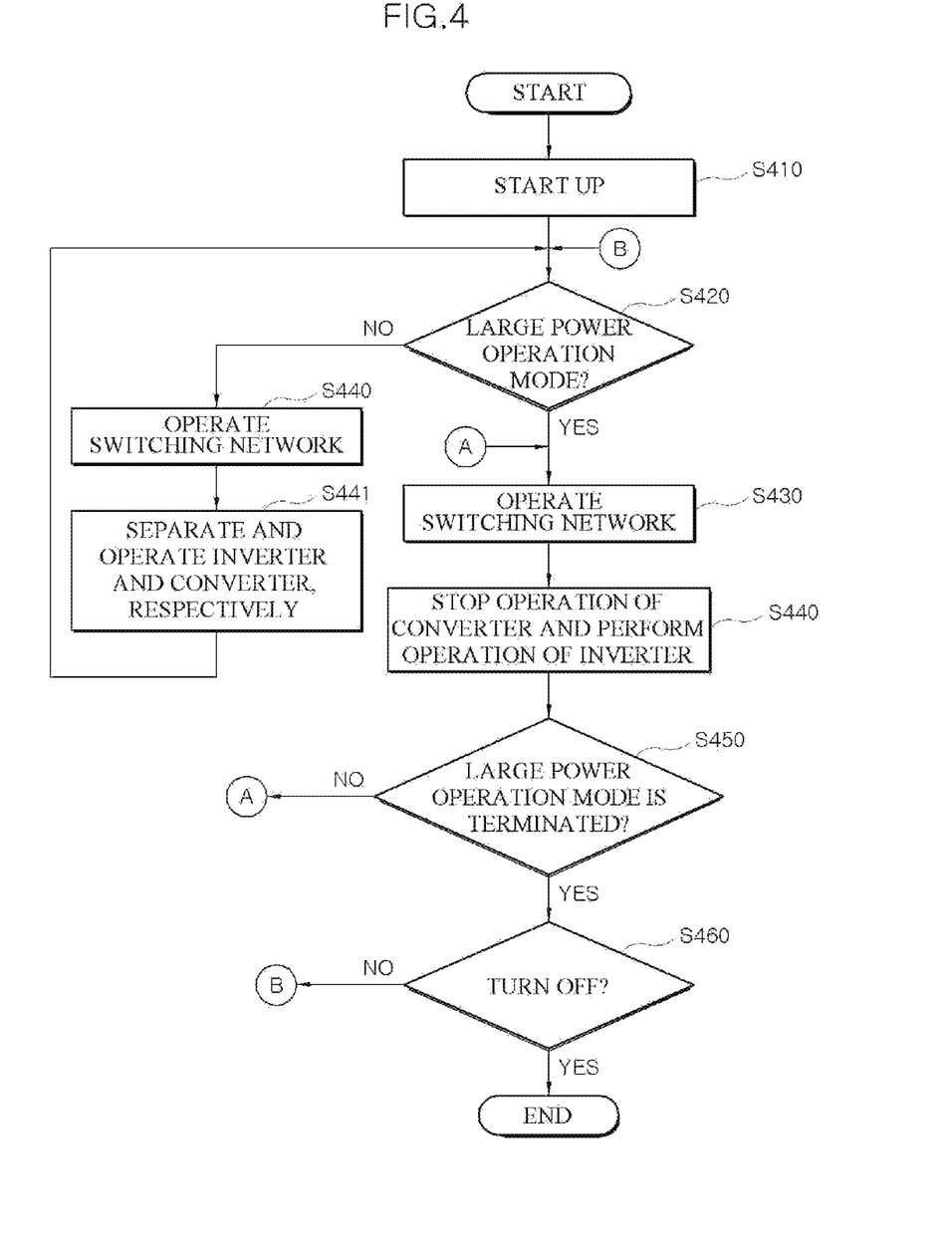
FIG. 4 is a flowchart illustrating a power conversion process according to an exemplary embodiment of the present disclosure.

FIG. 4 is a flowchart illustrating a power conversion process according to an exemplary embodiment of the present disclosure. Referring to FIG. 4, when the driver starts the vehicle, the vehicle controller 20 may be configured to start the engine 10 through operation of the driving motor 120 (step S410). Subsequently, the vehicle controller 20 may be configured to confirm whether the large power operation mode is activated (step S420). In particular, the large power operation mode is a mode in which only the inverter 210 is operated after stopping the operation of the converter when large power generation or torque assist is required.

In step S420, as a result of the mode determination, in response to determining that the vehicle controller 20 is in the large power operation mode, the switching network 220 may be operated to stop the operation of the converter 230 and to perform operation of the inverter 210 (step S440). Subsequently, whether the large power operation mode is terminated may be determined (step S450). As a result of the determination, in step S450, in response to determining that the large power operation mode is terminated, the vehicle controller 20 may operate in the normal operation mode. Subsequently, the vehicle controller 20 may be configured to determine whether the engine has been turned off to terminate the process (step S460).

Meanwhile, in step S420, as a result of the determination, in response to determining that the vehicle controller 20 is not in the large power operation mode, the mode may be switched to the general operation mode. In particular, the switching network may be operated to separate and operate the inverter 210 and the converter 230, respectively (steps S440 and S441).

Figure 5:
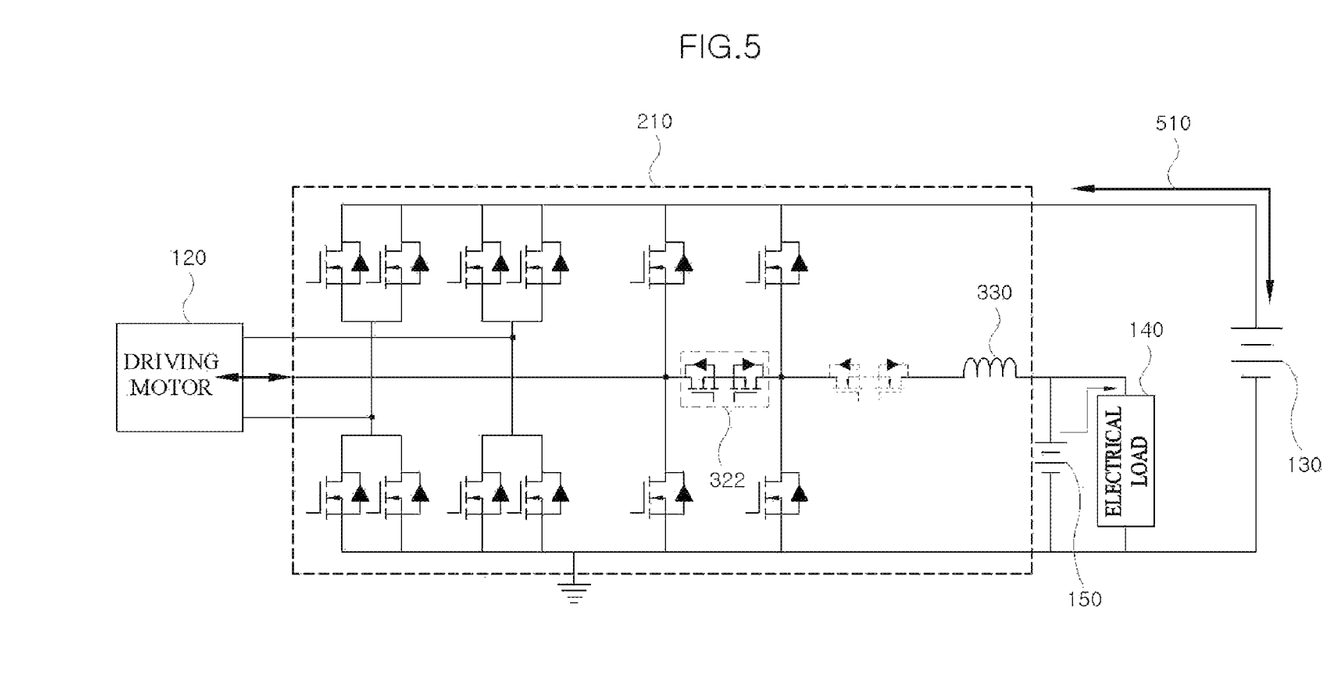
FIG. 5 is a diagram illustrating a power flow in a large-power operation mode according to FIG. 4 according to an exemplary embodiment of the present disclosure.

FIG. 5 is a diagram illustrating a power flow in the large power operation mode according to FIG. 4. Referring to FIG. 5, the inverter 210 may include three phases, and a power element (310 in FIG. 3) disposed on one of the three phases is shared with the converter 230. Accordingly, in the large power operation mode, the sharing relationship may be released, and all of the three phases of the inverter 210 may be configured to perform a parallel operation to be switched to a mode using large power. In other words, the vehicle may be operated by the large power generation for charging the first battery 130 or the torque assist for driving the driving motor 120. In the case of the large power generation, a power path 510 may be generated in the order of the driving motor 120 ->the inverter 210-> the first battery 130. On the contrary, in the case of the torque assist, the power path 510 may be generated in the order of the first battery 130 ->the inverter 210-> the motor 120. In particular, the second battery 150 is in charge of supplying power to the electrical load 140.

Figure 6:
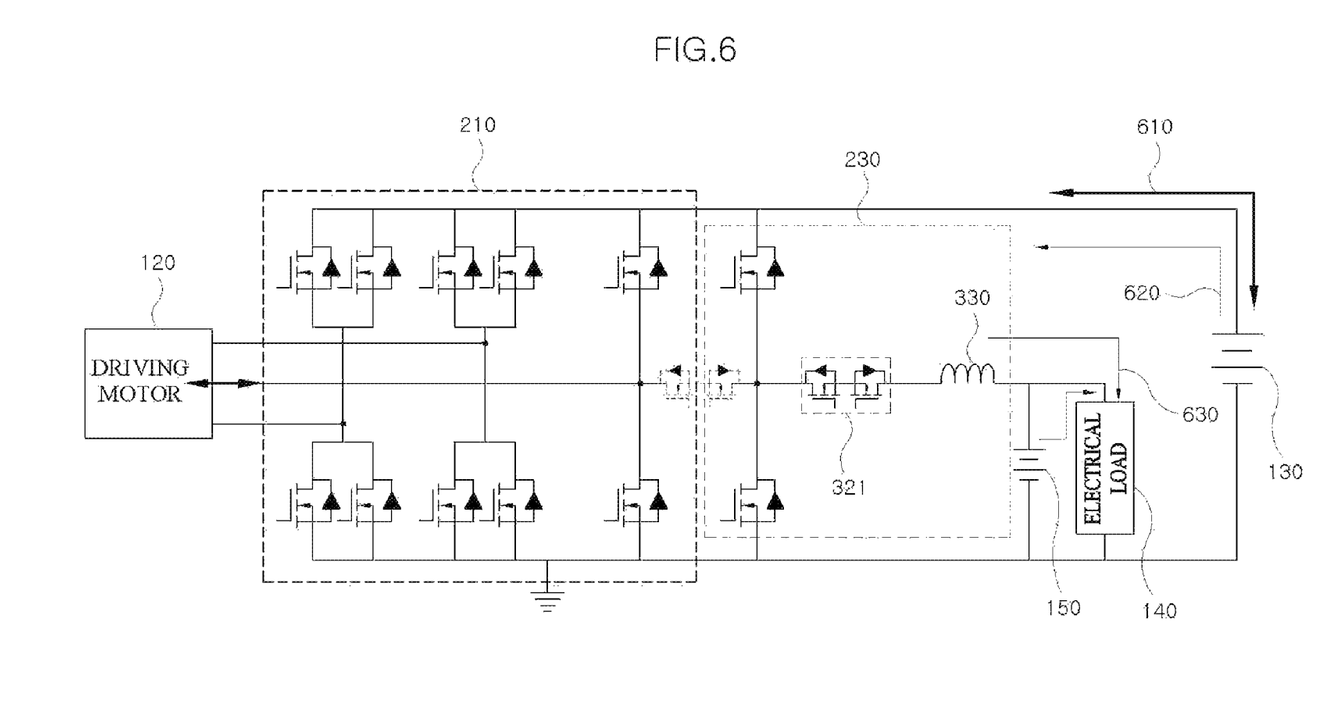
FIG. 6 is a diagram illustrating a power flow in a general operation mode according to FIG. 4 according to an exemplary embodiment of the present disclosure.

FIG. 6 is a diagram illustrating a power flow in the normal operation mode according to FIG. 4. FIG. 6 illustrates a case where the operation is not performed with large power. In the normal operation mode, when power is supplied to the electrical load 140 of 12V, the switching network 220 may be operated to turn off the second switching block 322 disposed on a first phase side of the inverter 210 to disconnect the converter 210 with the inverter 230. Accordingly, a power path 630 in which the power is supplied from the converter 230 to the electrical load 140 may be generated. In addition, a power path 610 may be generated between the first battery 130 and the inverter 210, and a power path 620 may be generated between the first battery 130 and the converter 230.

What is claimed is:

1. A vehicle power conversion apparatus, comprising:
  a driving motor connected to an engine;
  a power converter configured to selectively convert power in a plurality of modes to generate the power related to an operation of the driving motor; and
  a first battery configured to supply the power for the conversion or receive the converted power, wherein the power converter, an inverter and a converter are formed integrally;
  wherein the inverter is configured to supply alternating current (AC) power to the drving motor and the converter is configured to convert the AC power into direct current (DC) power;
  wherein the power converter includes a switching network configured to perform a power control between the converter and the inverter;
  wherein the switching network includes:
    a first switching block which cuts off the power transfer to the output side of the converter; and
    a second switching block which seperates the output of the converter from one phase output of the inverter upon an operation of the converter;
  wherein the first switching block and the second switching block are connected in the series.

2. The vehicle power conversion apparatus of claim wherein the plurality of modes include a large power operation mode and a general operation mode.

3. The vehicle power conversion apparatus of claim 2, wherein the converter is operated after being separated from one phase output of the inverter.

4. The vehicle power conversion apparatus of claim 2, wherein the large power operation mode is large power generation for charging the first battery or torque assist for driving the driving motor, the large power generation has a power path in the order of the driving motor, the inverter, and the first battery, and the torque assist has a power path in the order of the first battery, the inverter, and the motor.

5. The vehicle power conversion apparatus of claim 4, wherein in the large power operation mode, in response to determining that the power transfer to the output side of the converter is cut off, power is supplied to the electrical load from the second battery.

6. The vehicle power conversion apparatus of claim 1,
  wherein the inverter includes a plurality of power elements symmetrically for each phase, wherein the plurality of power elements are connected in parallel, and the first switching block is disposed between the plurality of power elements in one of the phases and is shared with the converter, and
  wherein the converter includes remaining power elements among the plurality of power elements shared with the inverter, the second switching block which is connected to the remaining power elements, and an inductor which is connected to the second switching block in series.

7. The vehicle power conversion apparatus of claim 1, wherein each of the first switching block and the second switching block has a back-to-back structure in which a plurality of switching elements are connected to each other in a back-to-back manner.

8. A vehicle power conversion method, comprising:
selecting, by a processor, a plurality of modes; and
converting, by a power converter, power to generate power related to an operation of a driving motor as the plurality of modes are selected;
wherein the power converter is configured to receive the power from a first battery, or the power converter is configured to supply the power to the first battery, wherein the power converter, an inverter and a converter are formed integrally;
wherein the inverter is configured to supply alternating current (AC) power to the drving motor and the converter is configured to convert the AC power into direct current (DC) power;
wherein the power converter includes a switching network configured to perform a power control between the converter and the inverter; and
wherein the switching network includes:
a first switching block which cuts off the power transfer to the output side of the converter; and
a second switching block which seperates the output of the converter from one phase output of the inverter upon an operation of the converter;
wherein the first switching block and the second switching block are connected in the series.

9. The vehicle power conversion method of claim 8, wherein the plurality of modes includes a large power operation mode and a general operation mode.

10. The vehicle power conversion method of claim 9, wherein the converter is operated after being separated from one phase output of the inverter.

11. The vehicle power conversion method of claim 9, wherein the large power operation mode is large power generation for charging the first battery or torque assist for driving the driving motor, the large power generation has a power path in the order of the driving motor, the inverter, and the first battery, and the torque assist has a power path in the order of the first battery, the inverter, and the motor.

12. The vehicle power conversion method of claim 11, wherein in the large power operation mode, in response to determining that the power transfer to the output side of the converter is cut off, power is supplied to the electrical load from the second battery.

13. The vehicle power conversion method of claim 8,
wherein the inverter includes a plurality of power elements symmetrically for each phase, the plurality of power elements are connected in parallel, and the first switching block is disposed between the plurality of power elements in one of the phases and is shared with the converter, and
wherein the converter includes the remaining power elements among the plurality of power elements shared with the inverter, a second switching block which is connected to the remaining power elements, and an inductor which is connected to the second switching block in series.

14. The vehicle power conversion method of claim 8, wherein each of the first switching block and the second switching block has a back-to-back structure in which a plurality of switching elements are connected to each other in a back-to-back manner.

* * * * *